March 3, 1970 A. E. RATHBUN 3,498,598
SOFT FRONT SPRING SEAT SUSPENSION
Filed Oct. 4, 1968 3 Sheets-Sheet 1

INVENTOR.
ALAN E. RATHBUN
BY Hamilton, Cook,
Renner & Kenner
ATTORNEYS

March 3, 1970  A. E. RATHBUN  3,498,598

SOFT FRONT SPRING SEAT SUSPENSION

Filed Oct. 4, 1968  3 Sheets-Sheet 2

INVENTOR.
ALAN E. RATHBUN
BY Hamilton, Cook,
Renner & Kenner
ATTORNEYS

March 3, 1970  A. E. RATHBUN  3,498,598
SOFT FRONT SPRING SEAT SUSPENSION
Filed Oct. 4, 1968  3 Sheets-Sheet 3

INVENTOR.
ALAN E. RATHBUN
BY *Hamilton, Cook,*
*Renner & Kenner*
ATTORNEYS

United States Patent Office 3,498,598
Patented Mar. 3, 1970

3,498,598
SOFT FRONT SPRING SEAT SUSPENSION
Alan E. Rathbun, 3135 Highland Drive,
Cuyahoga Falls, Ohio 44224
Filed Oct. 4, 1968, Ser. No. 765,082
Int. Cl. A47c 23/12, 23/26
U.S. Cl. 267—103                                    9 Claims

ABSTRACT OF THE DISCLOSURE

A spring seat suspension having a resilient rod frame hinged to a base at its rear side with strap means extending therefrom to the front side and at least one bowed spring rod extending between and abutting said front and rear sides of the frame, and stirrup means between the front portion of said bowed spring rod and said base resiliently supporting said front side on said base.

BACKGROUND OF THE INVENTION

The invention relates to spring seat suspensions which provide deep front cushioning without side sway or pitching so as to be particularly suited for seating one or more persons in automobiles and other vehicles.

In my U.S. Patent No. 3,263,987 I disclosed a spring seat suspension with bowed spring rods extending from front to back and having a relatively soft yielding front side without allowing any material amount of side sway or lateral pitching due to the motion of the vehicle. In said patent the spring frame is hinged at the back on a base support and supported at the front on a series of coil springs or on a pad of resilient foam or sponge material extending across the front of the frame.

The coil springs are noisy, relatively expensive, and difficult to fasten to the spring frame and to position in the furniture framing. Also, they tend to cause too much bounce when compressed. The foam or sponge material is relatively expensive and tends to take a permanent set in use.

It is difficult to control the amount of deflection of the spring frame for a given load with either the foam or the coil springs, and in either case the deflection is not readily adjustable without removing and replacing the coil springs or the foam pad.

SUMMARY OF THE INVENTION

It is an object of the present invention to provide an improved spring seat suspension which provides a relatively soft yielding front side with a minimum of side sway.

Another object is to provide an improved suspension which combines the overall resiliency of the bowed spring rod seat frame with novel auxiliary spring means supporting the front of the spring frame on the base.

The novel auxiliary spring means comprises U-shaped wire spring stirrup members each having its rear end engaging over and resting on a bowed spring rod of the spring frame adjacent its front end, and the front ends of its side members anchored to the supporting base under the front end of the frame, the side members being connected intermediate their ends by a resilient band which bears upwardly on the bowed spring rod.

DESCRIPTION OF THE PREFERRED EMBODIMENTS

Figure 1:
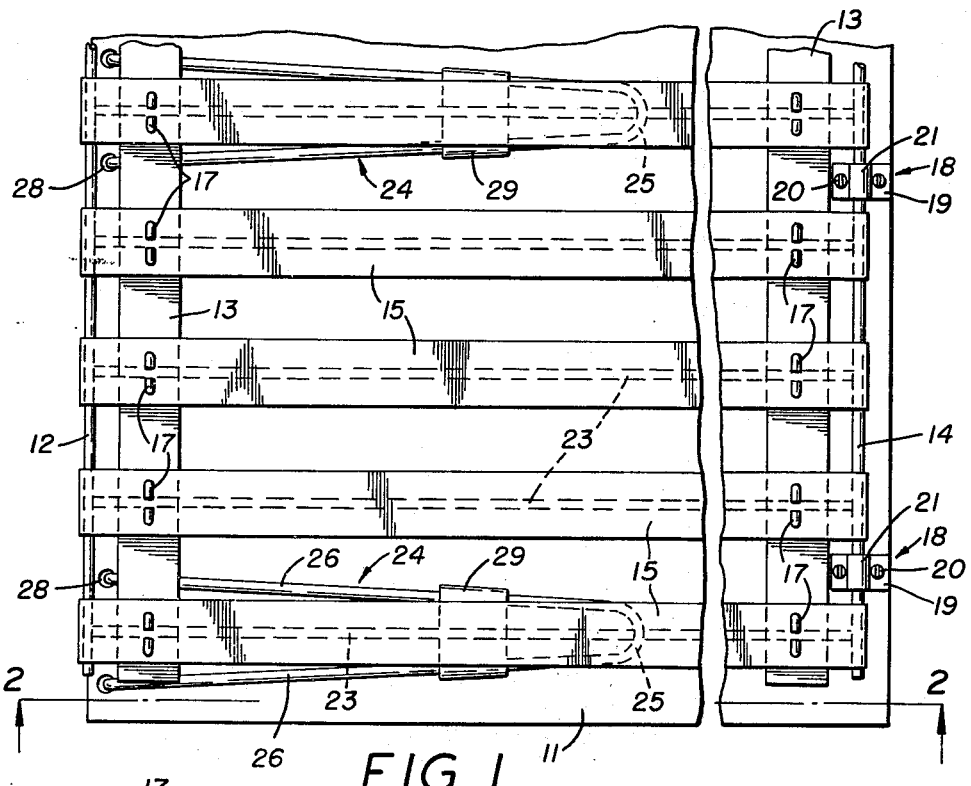
FIG. 1 is a top plan elevation, partly broken away, of the improved spring seat suspension mounted on a rigid base.
Figure 2:
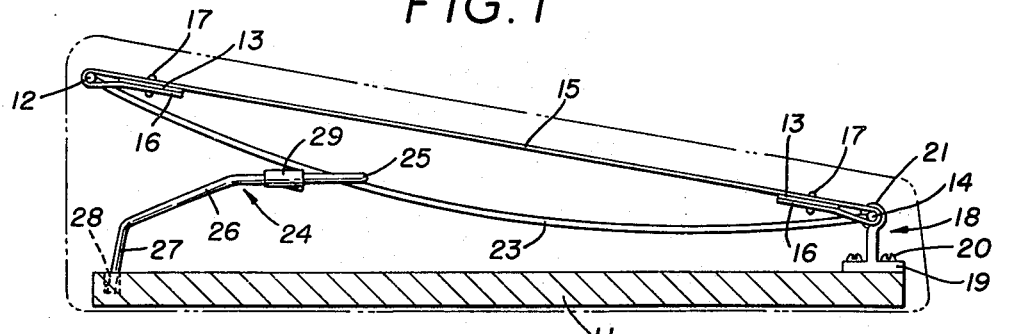
FIG. 2 is an end elevational view as on line 2—2 of FIG. 1.
Figure 3:
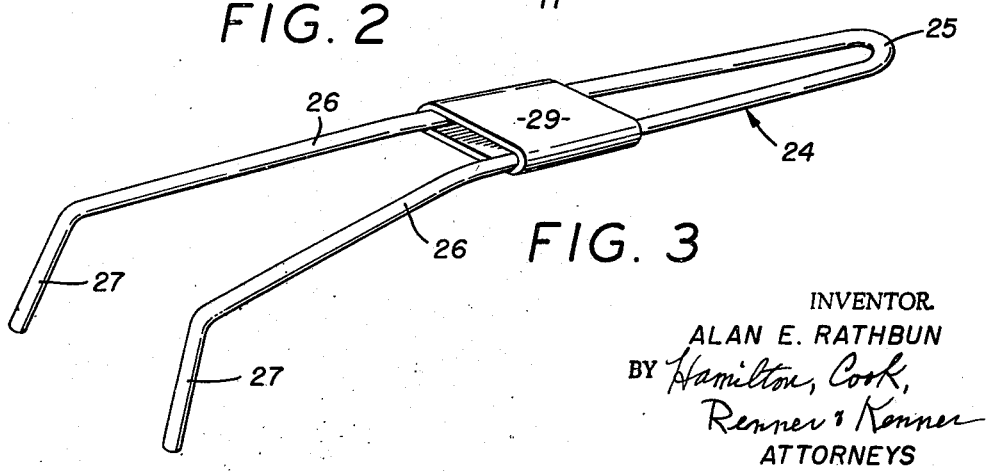
FIG. 3 is a detached perspective view of one of the stirrup members.
Figure 4:
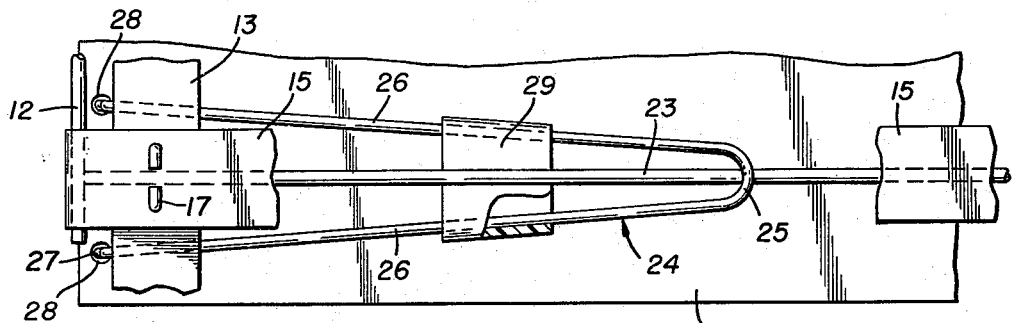
FIG. 4 is a fragmentary enlarged plan view similar to FIG. 1, with parts broken away.
Figure 5:
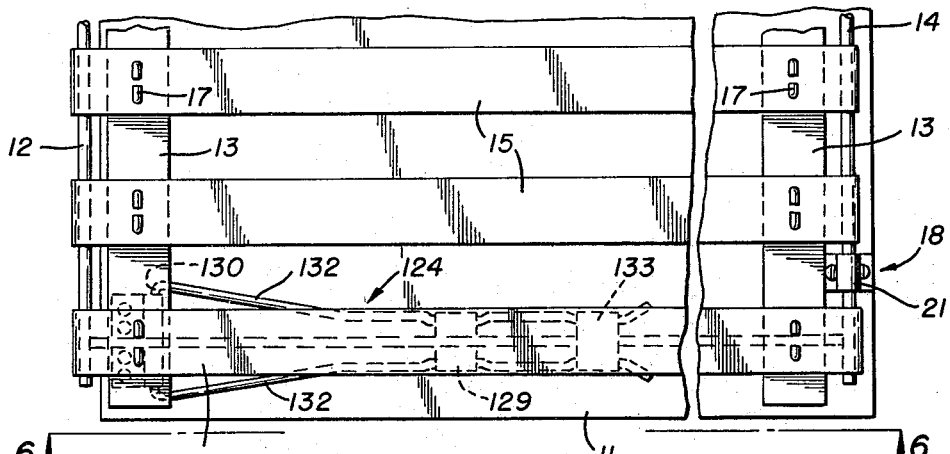
FIG. 5 is a plan view similar to FIG. 1 of a modified stirrup member.
Figure 6:
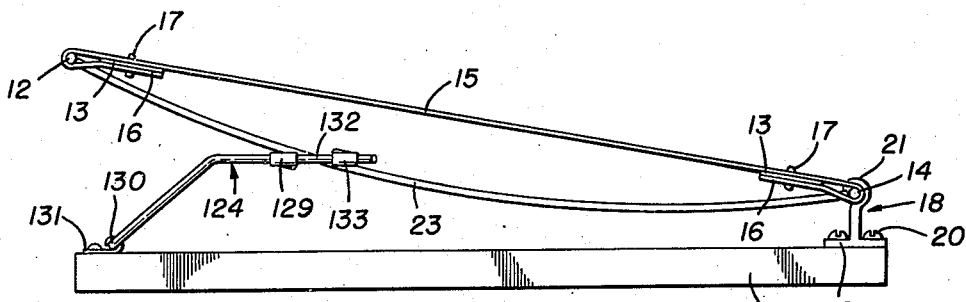
FIG. 6 is an end elevational view as on line 6—6 of FIG. 5.
Figure 7:
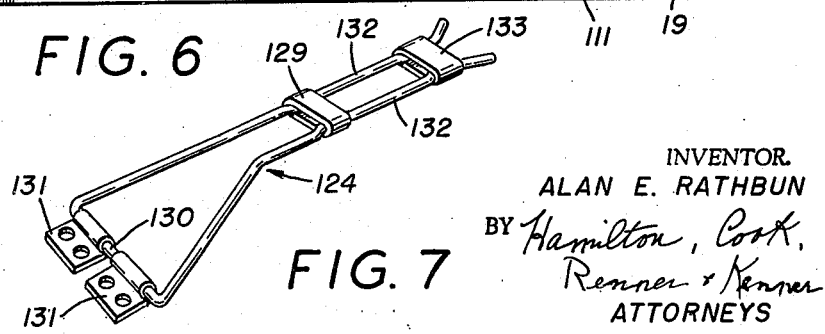
FIG. 7 is a detached perspective view of one of the stirrups of FIGS. 5 and 6.
Figure 8:
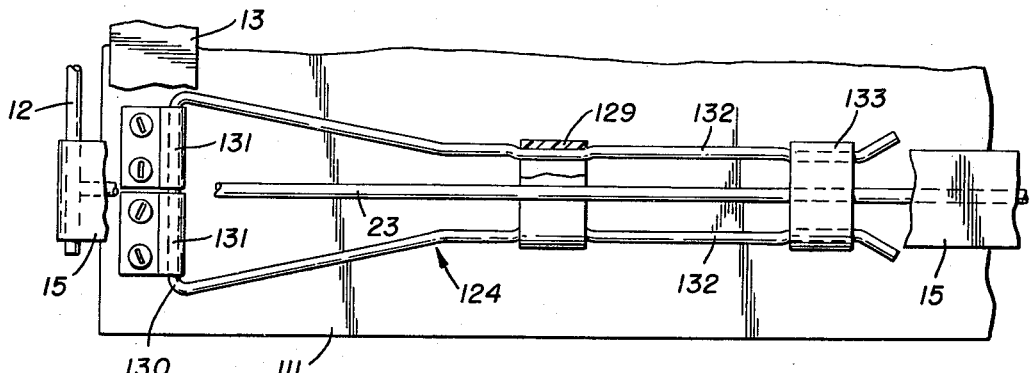
FIG. 8 is a fragmentary enlarged plan view similar to FIG. 5, with parts broken away.

Referring first to FIGS. 1 to 4, the improved spring seat suspension is mounted on a rigid base 11, and has a spring frame including a front resilient rod 12 and a rear resilient rod 14. The rods 12 and 14 may be connected at their ends by end rods (not shown) but this is not essential. Extending between the front and rear rods 12 and 14 are laterally spaced bands 15 of webbing material. While the webbing 15 may be of any suitable material which is resilient and nonextensible, thin metal bands of tempered steel having their ends wrapped around the rods 12 and 14 with the overlapping portions 16 secured together by spot welding or staples 17, is satisfactory. Obviously, the bands 15 may be interlaced or otherwise arranged, if desired.

Preferably, longitudinal tapes 13 connect the spaced apart transverse bands 15 at their front and rear portions. The tapes may be of suitable flexible material such as plastic, and may extend between the overlapping portions of the bands so as to be secured thereto by the staples 17.

The spring frame may be of such length as to provide a single seating area, or it may be extended to provide a plurality of seating areas, preefrably three, so as to be suitable for a multiple seat in a conventional automobile.

Hinge means 18 are provided for supporting the rear frame rod 14 upwardly of the base 11. These hinges are mounted at suitable intervals along the rod 14 and between the bands 15, preferably at least one hinge for each seating area. The hinges 18 may each comprise a bracket having a base 19 secured to the base 11 by screws 20, and an eye 21 at the top encircling the rear rod 14. This arrangement provides for obtaining the greatest comfort with the least amount of side sway or pitching action.

Bowed spring rod compression members 23 are provided at lateral intervals and extend from front to back of the spring frame with the ends of the bowed rods 23 abutting the front and rear rods 12 and 14 under sufficient compression to bow the rods 23 as shown. The ends of the bowed rods may be fitted into notches in the frame rods 12 and 14, or they may be welded thereto. As shown, the ends of the bowed rods 23 may be received in slots in the overlapping portions 16 of the bands 15, but the lateral spacing of the bowed rods may vary from that of the bands. It is preferable to have at least one bowed spring rod for each seating area.

The bowed rods 23 provide controlled yielding movement under load of the front rod 12 toward the rear rod 14 and a slight forward movement of those portions of the rear rod 14 between the hinges 18. The seating load applied to the bands 15 causes them to sag slightly as controlled by the flexure of the bowed spring rods 23, thus providing a firmly comfortable support to persons seated thereon without any material sway or pitching movement.

As an example of a suspension for average seating loads, the frame rods 12 and 14 may be ⅛″ to ⅜″ in diameter, and the bowed spring rods may be ⅛″ to ⅜″ in diameter.

The novel auxiliary spring means to give the suspension a relatively soft and deep yielding effect at the front side, while keeping the overall stable support without material side sway or pitching, comprises the novel stirrup means for supporting the front side of the spring frame on the front of the base. The so-called stirrup means each preferably comprises a U-shaped spring wire 24 having its closed end portion 25, connecting its legs 26, engaging over and resting on top of a bowed spring rod 23 in the front portion thereof, and its legs 26 straddling the rod 23 and anchored to the front side of the base 11.

Each stirrup 24 engirdles a bowed compression member 23, but, depending upon the amount of resilience desired, stirrups may be omitted from some of the rods 23, as indicated in the drawings. The wires or rods 24 may be of substantially the same material and size as the bowed rods 23.

As shown in FIGS. 1–4, the end portions 27 of the legs 26 are bent downwardly and enter sockets 28 in the front of the base 11. The intermediate portions of the legs 26 are resiliently connected by a tubular bridge member 29 which, under load, bears upwardly against the bowed spring rod 23. The members 29 may be made of any suitable material which has resilience and does not take any material amount of permanent set. Molded polyurethane tubing has been found satisfactory, and gives substantially noiseless spring action.

Obviously, the amount and character of the resilience of the front side of the spring seat suspension may be varied by changing the number and/or the material of the members 24, by varying the diameter and/or the length of the legs 26, and by varying the diameter of the compression bars.

As the seating load is applied, the spring action differs from that of the conventional spring seat suspensions of which I am aware, in that the combined action of the bowed spring compression rods and the auxiliary spring stirrup means allows the whole suspension to deflect as a unit rather than in a sequential spring action.

In the embodiment shown in FIGS. 5–8, the stirrup members 124 have their closed ends 130 anchored to the front of the base 111 by clips 131 which permit hinging movement of the stirrups under load. The rear free ends of the legs 132 are connected by a resilient bridge member 133 which is preferably polyurethane tubing and engages over the resiliently rests on top of a bowed spring compression member 23. A bridge of polyurethane tubing 129 resiliently connects the intermediate portions of the legs 132 and bears upward against the member 23 in the same manner as the bridge 29 of the embodiment of FIGS. 1–4.

The embodiment of FIGS. 5–8 tends to be more noiseless in operation than the form of FIGS. 1–4, because both abutments with the bowed spring rods 23 are polyurethane. Obviously, the legs 132 may be disconnected at their front ends and provided with downturned ends received in sockets in the base, as in FIGS. 1–4.

Figure 9:
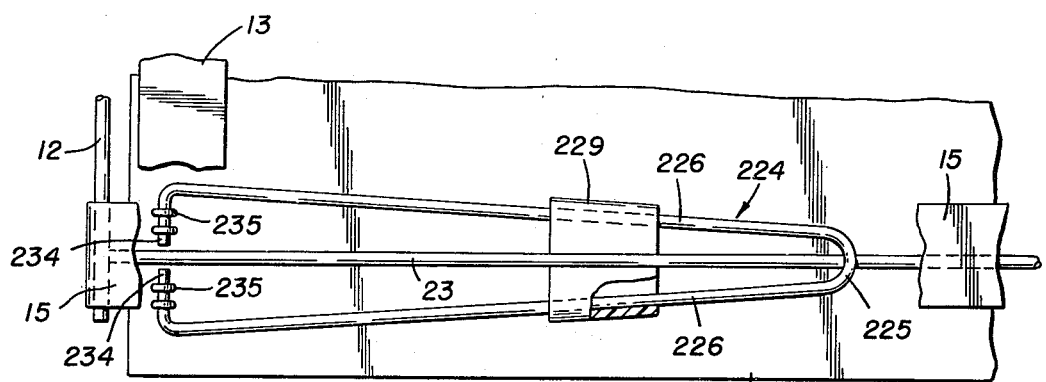
FIG. 9 is a view similar to FIG. 8 of still another embodiment.
Figure 10:
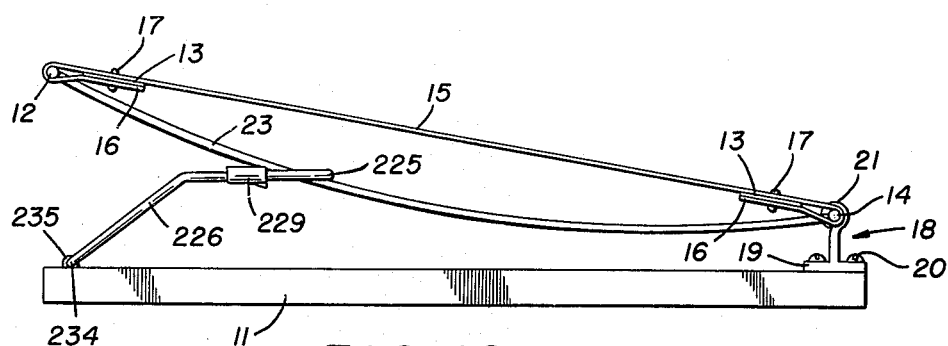
FIG. 10 is an end elevation similar to FIGS. 1 and 6, showing the embodiment of FIG. 9.

In the embodiment of FIGS. 9 and 10, the stirrups 224 are quite similar to the stirrups 24 in FIGS. 1–4, except that the front end portions 234 of the legs 226 are bent inwardly toward each other in a substantially horizontal plane, and the end portions are hingedly fastened to the base 11 by staples 235. The closed end 225 of each stirrup bears down on a bowed compression rod 23 and a tubular polyurethane bridge 229 bears upwardly against the rod.

The several embodiments of the invention provide an improved spring seat suspension with a relatively soft resilient front side having a unitary action with a minimum of pitching and side sway, the amount of resiliency being easily adjustable to suit a variety of conditions.

I claim:

1. In a spring seat suspension comprising a spring rod frame having front and rear spring rods, spaced resilient transverse bands extending between said rods, at least one bowed spring compression rod extending between and having its ends abutting said front and rear frame rods, a base, and hinge means supporting said rear frame rod on said base, the improvement comprising stirrup means yieldingly supporting the front portion of said compression rod on said base, said stirrup means having two side legs straddling said compression rod, a cross connection connecting the rear ends of said legs and bearing downwardly upon the top of said compression rod, a resilient cross member connecting the intermediate portions of said legs and bearing upwardly upon the bottom of said compression rod, and means connecting the front ends of said legs to said base.

2. The improvement in a spring seat suspension as defined in claim 1, in which the cross connection at the rear ends of the legs is a U-shaped bend integral with said legs.

3. The improvement in a spring seat suspension as defined in claim 1, in which the cross connection at the rear ends of the legs is a resilient tube.

4. The improvement in a spring seat suspension as defined in claim 3 in which the cross connection at the rear ends of the legs is a resilient tube of polyurethane.

5. The improvement in a spring seat suspension as defined in claim 1, in which the means connecting the front ends of the legs to the base comprises sockets in the base anchoring the ends of the legs.

6. The improvement in a spring seat suspension as defined in claim 1, in which the means connecting the front ends of the legs to the base comprises horizontal inturned portions on said legs, and means hinging said portions to said base.

7. The improvement in a spring seat suspension as defined in claim 1, in which the cross connection at the rear ends of the legs is a U-shaped bend integral with said legs, and the front ends of said legs are anchored in sockets in said base.

8. The improvement in a spring seat suspension as defined in claim 1, in which the cross connection at the rear ends of the legs is a resilient tube, and the front ends of said legs have horizontal portions hinged to said base.

9. The improvement in a spring seat suspension as defined in claim 1, in which the cross connection at the rear ends of the legs and the cross member at the intermediate portions of the legs are resilient tubes of polyurethane.

References Cited

UNITED STATES PATENTS

| 3,165,308 | 1/1965 | Rathbun | 267—11 |
| 3,263,987 | 8/1966 | Rathbun | 267—103 |

ARTHUR L. LA POINT, Primary Examiner